(12) United States Patent
Brunee

(10) Patent No.: US 9,434,548 B2
(45) Date of Patent: Sep. 6, 2016

(54) INSTALLATION FOR PROCESSING ARTICLES, THE INSTALLATION INCLUDING A SCREW TRANSFER DEVICE

(71) Applicant: Serac group, La Ferte Bernard (FR)

(72) Inventor: Jacky Brunee, São Paulo (BR)

(73) Assignee: SERAC GROUP, La Ferte Bernard (FR)

( * ) Notice: Subject to any disclaimer, the term of this patent is extended or adjusted under 35 U.S.C. 154(b) by 82 days.

(21) Appl. No.: 13/967,615

(22) Filed: Aug. 15, 2013

(65) Prior Publication Data

US 2014/0048386 A1    Feb. 20, 2014

(30) Foreign Application Priority Data

Aug. 16, 2012    (FR) ...................................... 12 57839

(51) Int. Cl.
| | |
|---|---|
| *B65G 33/04* | (2006.01) |
| *B65G 19/02* | (2006.01) |
| *B65G 35/08* | (2006.01) |
| *B65G 35/06* | (2006.01) |
| *B65G 47/90* | (2006.01) |

(52) U.S. Cl.
CPC ............... *B65G 19/02* (2013.01); *B65G 35/08* (2013.01); *B65G 35/066* (2013.01); *B65G 47/908* (2013.01); *B65G 2201/0247* (2013.01)

(58) Field of Classification Search
USPC ..................................................... 198/467.1
See application file for complete search history.

(56) References Cited

U.S. PATENT DOCUMENTS

| | | | | |
|---|---|---|---|---|
| 3,651,755 A | * | 3/1972 | Gati ................................. | 100/96 |
| 4,122,790 A | * | 10/1978 | Rowe et al. .................... | 53/411 |
| 5,161,664 A | * | 11/1992 | LeBras ................ | B65G 47/082 |
| | | | | 198/418.7 |
| 5,630,311 A | * | 5/1997 | Flix ................................. | 53/543 |
| 6,398,006 B1 | | 6/2002 | Dault | |
| 7,374,392 B2 | * | 5/2008 | Biondi et al. .............. | 414/795.1 |
| 2009/0278288 A1 | * | 11/2009 | Haesendonckx ....... | B29C 49/12 |
| | | | | 264/528 |
| 2011/0175246 A1 | * | 7/2011 | Winzinger .............. | B29C 49/78 |
| | | | | 264/40.1 |
| 2011/0302883 A1 | * | 12/2011 | Monti ............................ | 53/281 |

FOREIGN PATENT DOCUMENTS

| | | |
|---|---|---|
| DE | 3639271 A1 | 5/1988 |
| EP | 0010131 A1 | 4/1980 |
| EP | 0144478 A1 | 6/1985 |
| EP | 0447123 A1 | 9/1991 |
| EP | 2100815 A1 | 9/2009 |
| FR | 2 370 658 A1 | 6/1978 |
| GB | 1 552 994 | 9/1979 |
| WO | WO 2005/023518 A1 | 3/2005 |

* cited by examiner

*Primary Examiner* — Leslie A Nicholson, III
*Assistant Examiner* — Lester Rushin
(74) *Attorney, Agent, or Firm* — Muncy, Geissler, Olds & Lowe, P.C.

(57) ABSTRACT

An installation for processing articles, the installation comprising an article-transfer device extending between two processing stations, the transfer device comprising a rail having at least one rectilinear segment and defining a closed travel path for carriages that are mounted on the rail to move freely therealong, each of which is provided with means for driving at least one article, the transfer device comprising a screw extending along the rectilinear segment of the rail and having a thread that co-operates with fingers secured to the carriages in order to drive the carriages along the rectilinear segment.

17 Claims, 5 Drawing Sheets

INSTALLATION FOR PROCESSING ARTICLES, THE INSTALLATION INCLUDING A SCREW TRANSFER DEVICE

The present invention relates to an installation for processing articles and including an article-transfer device.

By way of example, the articles may be finished containers or containers in an intermediate form in the process of being fabricated. By way of example, the processing installation may be an installation for filling a substance into containers that are inserted in the finished state into the inlet of the installation: the installation then includes in particular a station for cleaning and/or decontaminating the containers, a filler station, and an installation for capping the containers. It is equally possible for the installation to be a filler installation that works using container preforms. The installation then includes in particular a station for heating the preforms, an installation for blowing the preforms in order to form the containers, a filler station, and a container-capping station.

Between two consecutive stations, there are mounted one or more transfer devices for taking the containers from one station to another.

The processing installation is then in the form of a production line along which the containers are moved at a predetermined advance pitch (the advance pitch is the spacing that is maintained between the containers as they progress along the production line).

That type of architecture is particularly effective when the advance pitch of the containers is the same in all of the processing stations and does not need to be modified when changing from processing one series of containers to another series of containers of a different size.

In contrast, when the advance pitch of the containers at the outlet from an upstream station is different from the advance pitch of the containers at the inlet of a downstream station, e.g. when one of the stations processes containers in batches while the other station processes containers individually, or when the stations have different cycle times, the transfer device needs to include a portion for buffer storage of the containers so as to enable containers to accumulate and then be used at the appropriate pitch for feeding the station downstream. Such a storage portion generally presents dimensions that are relatively large and increases the overall size of the production line, either lengthwise, or else locally in the width direction, depending on the way the storage device is oriented relative to the production line.

In addition, any change to the advance pitch of the containers in any one of the working stations requires very cumbersome intervention on the transfer device, and sometimes requires it to be changed completely. Such a modification of the advance pitch takes place relatively frequently in blowing machines, which are generally adapted to be capable of fabricating containers of different capacities, with the total volume of the containers that are blown simultaneously being no greater than the maximum blowing capacity of the machine. By way of example, such a blowing machine may blow any of the following combinations simultaneously: two three-liter containers; four one-liter containers; or six half-liter containers; depending on the molds that are mounted in the machine. The flexibility of an installation thus depends to a great extent on its transfer devices, which at present are relatively inflexible.

An object of the invention is to provide means that are simple and reliable for increasing the flexibility of such installations.

To this end, the invention provides an installation for processing articles, the installation comprising a first processing station, a second processing station, and an article-transfer device extending between the two processing stations, the transfer device comprising a rail having at least one rectilinear segment and defining a closed travel path for carriages that are mounted on the rail to move freely therealong, each of which is provided with means for driving at least one article, the transfer device comprising a screw extending along the rectilinear segment of the rail and having a thread that co-operates with fingers secured to the carriages in order to drive the carriages along the rectilinear segment, the carriages being in contact with one another and being mutually spaced relative to one another at a first spacing when they are not co-operating with the screw, and the thread of the screw is arranged to hold the carriages at at least one second spacing that is greater than the first spacing.

Thus, the screw has two functions: it maintains a spacing between the carriages equal to the pitch of the screw so long as the carriages are in contact therewith, and it causes the carriages to move along the rail. When the carriages are no longer in engagement with the screw, they are in contact with one another and they push against one another under the effect of the movement imparted by the screw to each carriage leaving the screw and coming into contact with its predecessor. Two zones are thus defined along the transfer device: a first zone in which the containers are in contact with one another, the carriages being mutually spaced at a first spacing, and a second zone (corresponding to the rectilinear segment) in which the carriages are maintained at a mutual spacing by the screw until the carriages are mutually spaced at the second spacing. This provides a particularly simple way of modifying the advance pitch of articles along the transfer device. It can be understood that by replacing a screw that has a first pitch with a screw that has a second pitch different from the first pitch, it is simple to modify the spacing of the carriages along the screw.

Other characteristics and advantages of the invention appear on reading the following description of particular, non-limiting embodiments of the invention.

Reference is made to the accompanying drawings, in which.

Figure 1:
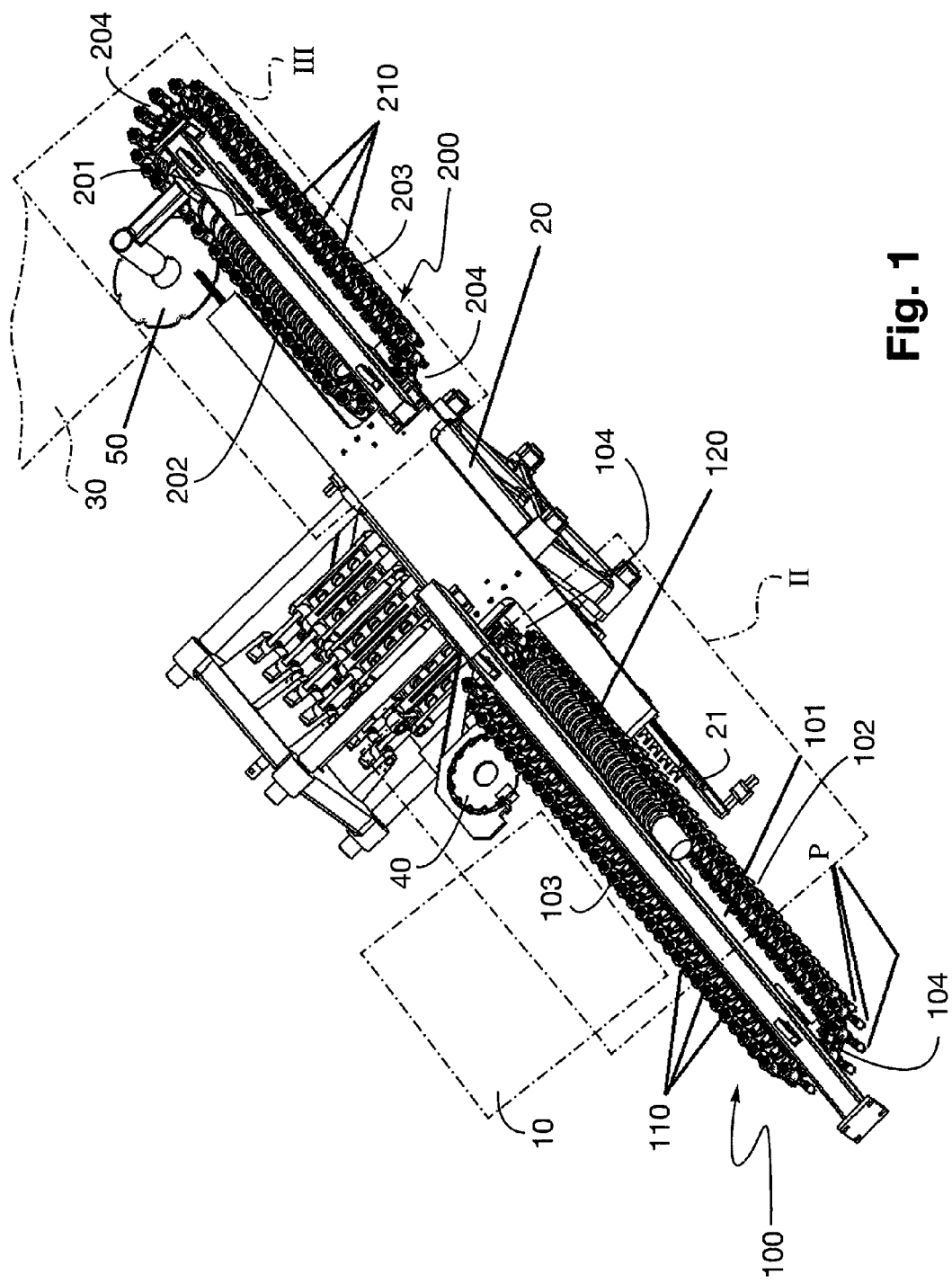
FIG. 1 is a perspective view of an installation in accordance with the invention for processing containers.
Figure 2:
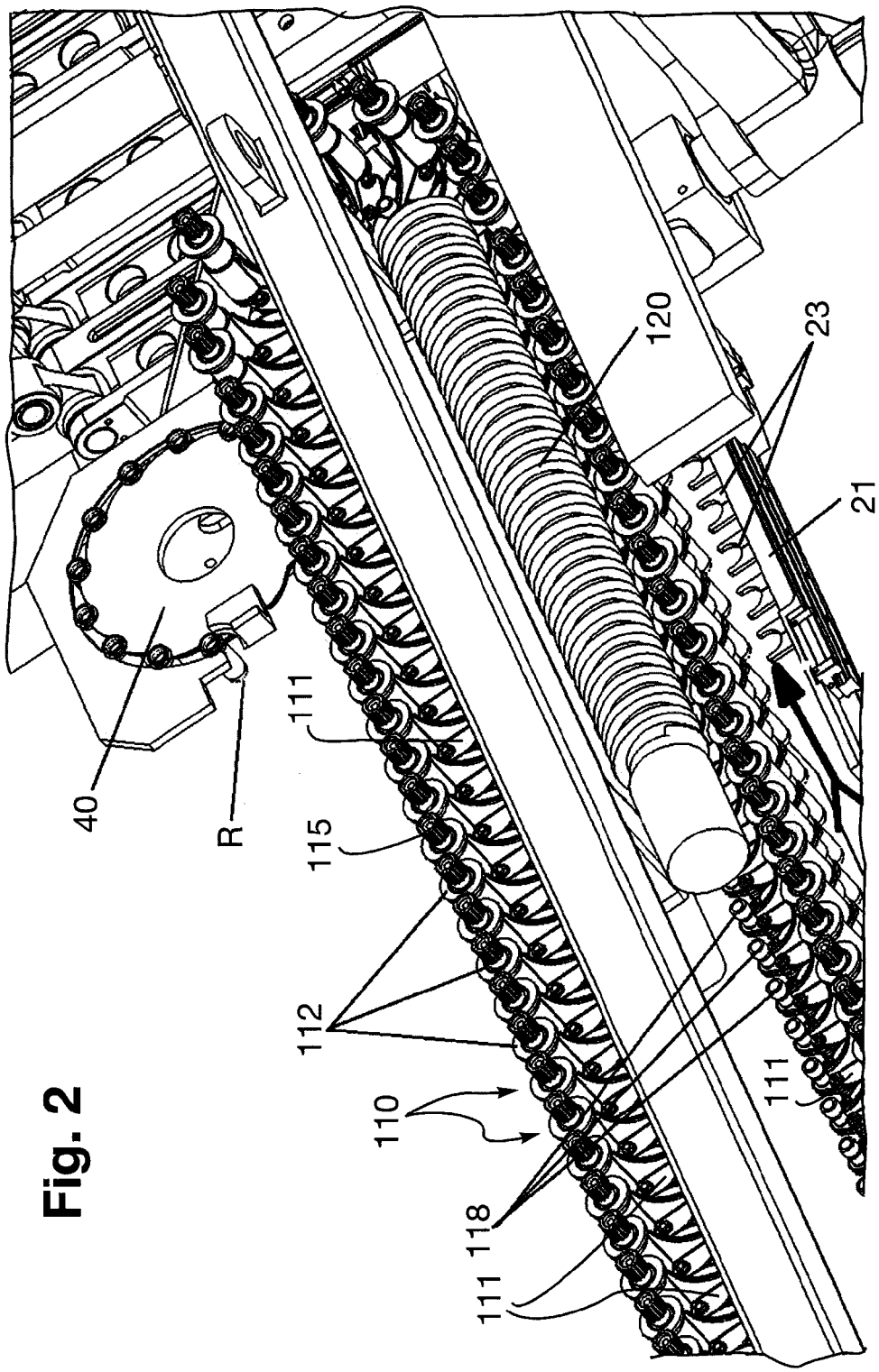
FIG. 2 is an enlarged view in perspective of a zone II in FIG. 1, seen from substantially the same viewpoint.

The invention is described herein in an application to processing containers R and more precisely to an installation for heating preforms P, blowing preforms in molds in order to form containers, filling the containers, and capping them. Each preform and container has a neck that defines a top opening for the preform P or the container R and that is surrounded by a collar.

With reference to the figures, the installation thus comprises, going from upstream to downstream in the travel direction of the preforms P and of the containers R: a heater station shown symbolically at 10; a blowing station carrying the Reference 20; and a filler unit shown symbolically at 30. The heater station 10 is in the form of a tunnel and receives preforms P as inputs and then heats them so that the preforms P reach a temperature appropriate for them to be shaped by blowing. The blowing station 20 has a battery of molds having the shape of the containers R, and a blowing unit arranged to blow air under pressure into the preforms P as received in the molds in order to press the walls of the preforms P against the inside surfaces of the molds and thus form the containers R. The filler station 30 includes filler nozzles for filling the containers in question. The heater station 10, the blowing station 20, and the filler station 30 are themselves known and are not described in greater detail herein. The installation also has a station for decontaminating the preforms P and a station for capping the containers R, which stations are also themselves known and are neither described nor shown herein.

Preforms are fed to the blowing station 20 by a comb 21 that performs rectangular motion and that is arranged to take hold simultaneously of as many preforms P as the battery of molds has molds, and to bring said preforms P into the molds. For this purpose, the comb 21 is fitted with known gripper means, and specifically with clamps 23 in this example.

The containers are removed from the blowing station 20 by a comb 22 that performs rectangular motion and that is arranged to take hold of as many containers as the mold battery has molds, and to extract said containers from the molds and from the blowing station 20. For this purpose, the comb 22 is fitted with known gripper means, specifically in this example clamps that are not visible in the figures.

The blowing station 20 also has means for moving and controlling the combs 21 and 22, which means are themselves known and are not described in detail herein.

The installation also has a first transfer device 100 between the heater station 10 and the blowing station 20, a second transfer device 200 between the blowing station 20 and the filler station 30, a first intermediate transfer unit 40 between the blowing station 10 and the transfer device 100, and a second intermediate transfer unit 50 between the transfer device 200 and the filler station 30.

The transfer devices 100 and 200 are analogous in structure. Each transfer device 100, 200 comprises a rail 101, 201 defining a closed travel path for carriages, given overall references 110, 210, which carriages are mounted on the rail to move freely therealong.

Each rail 101, 201 possesses two rectilinear segments 102, 103 or 202, 203 that extend parallel to each other and that are connected together by curved segments 104, 204. The rectilinear segments 102, 103, 202, 203 extend parallel to the combs 21, 22, with the rectilinear segments 102, 202 facing the combs 21, 22.

Each carriage 110, 210 is provided with a body 111, 211 provided with drive means 112, 212 respectively for driving a preform or a container.

The drive means 112 comprise a vertical spindle 113 having a bottom end provided with a preform gripper member 114. In this example, the gripper member 114 comprises a radially-expandable element for gripping the neck of a preform from the inside. The spindle 113 is mounted on the body 111 to pivot about the vertical and it possesses a toothed portion 115 meshing with a linear gear (not visible in the figures) that runs along the rail 101 in order to drive the spindle 113 in rotation during the movement of the carriage 110. By way of example, the gear is a cog belt. The spindle 113 is also mounted on the body 111 to slide in a vertical direction between a low position for gripping preforms and a high position for releasing preforms. The spindle 113 possesses a portion that cooperates with a stationary cam path in order to move the spindles 113 between their two positions. Said portion and the stationary cam path are not visible in the figures.

Figure 3:
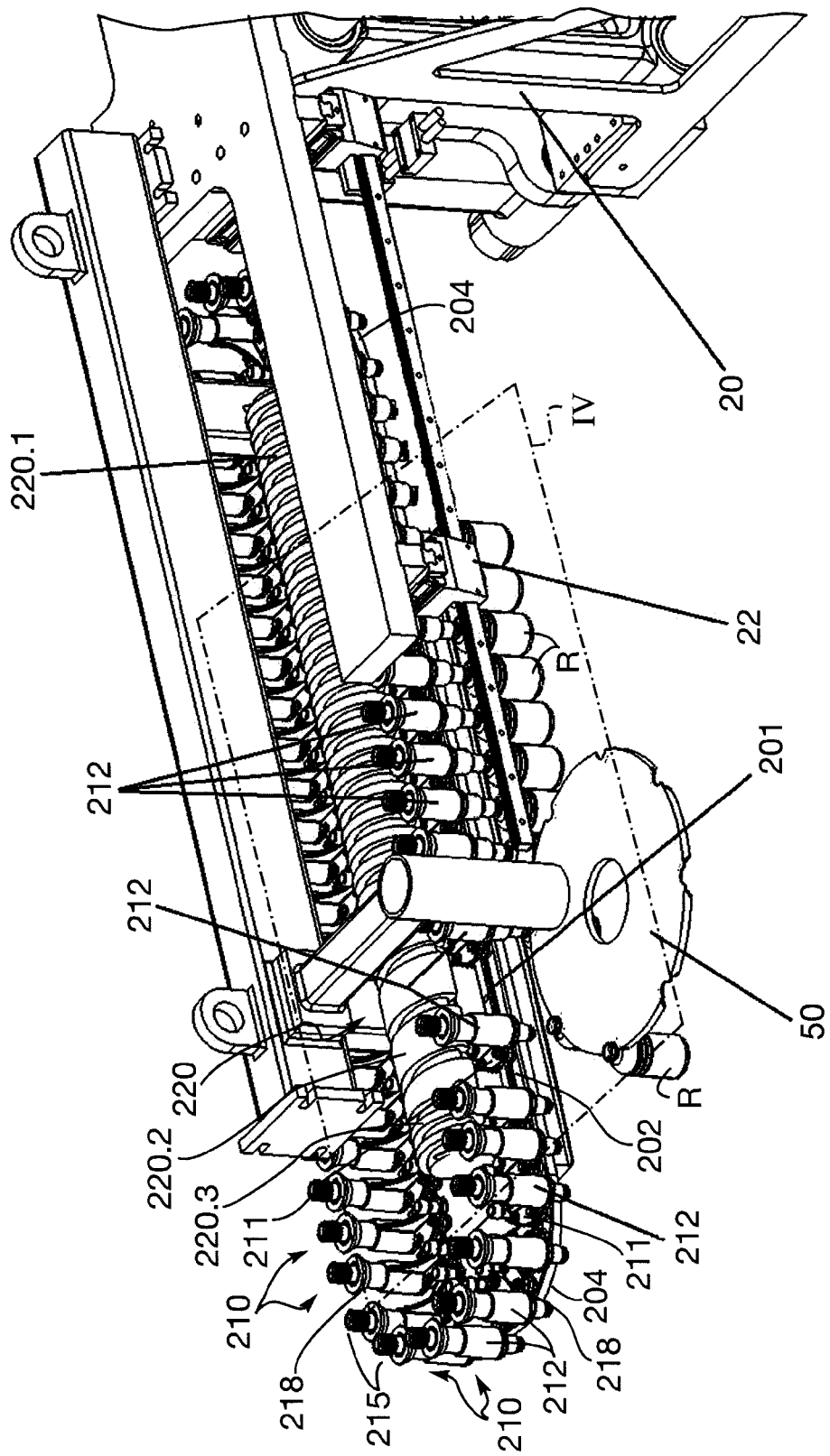
FIG. 3 is an enlarged perspective view of a zone III in FIG. 1, seen from behind.
Figure 4:
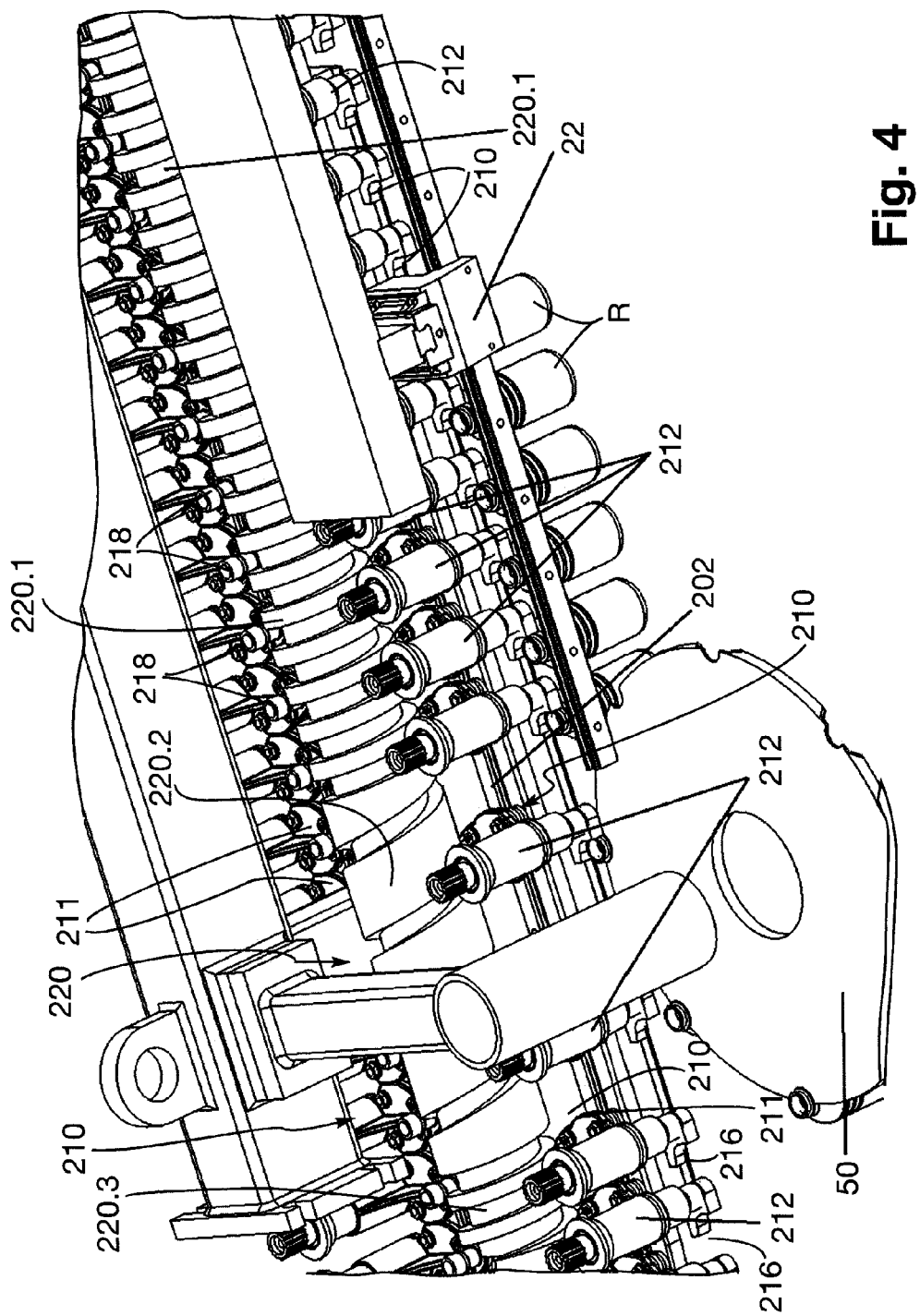
FIG. 4 is an enlarged view in perspective of zone IV of FIG. 3 seen from a viewpoint that is offset to the right, showing a variant embodiment.
Figure 5:
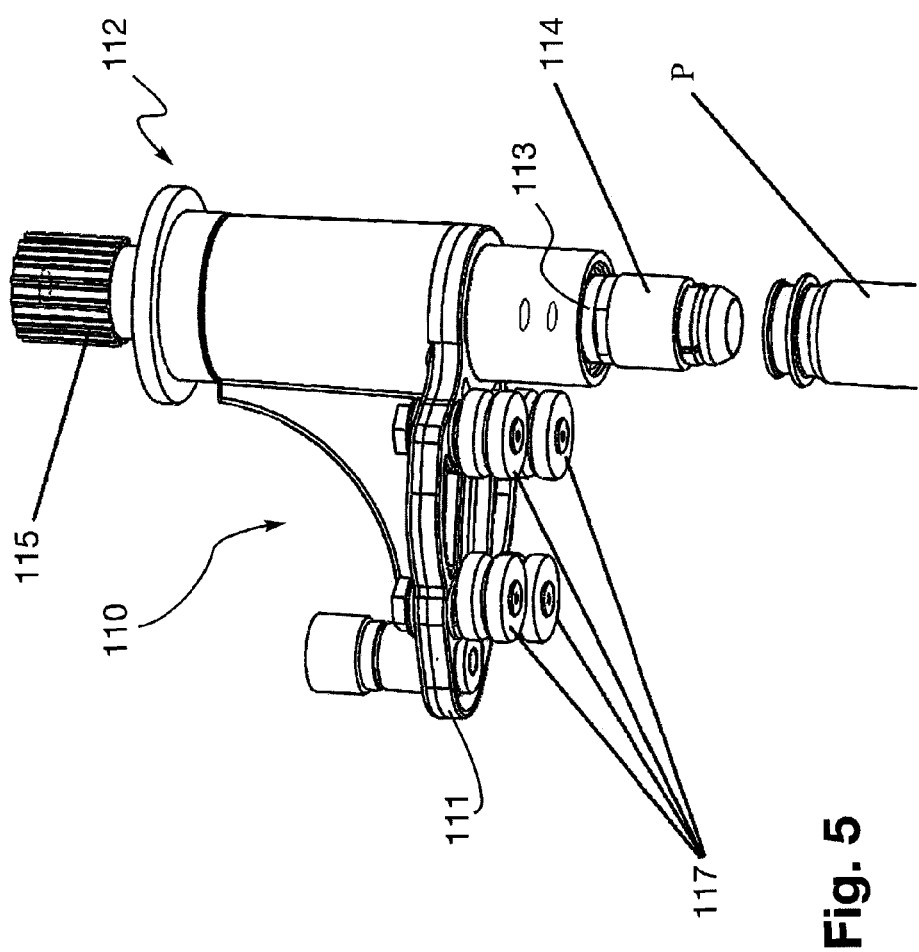
FIG. 5 is a perspective view of a carriage for transporting preforms and containers.

The drive means 212 are identical to the drive means 112 (in FIG. 3 there can be seen the bodies 211, the gripper members 214, and the toothed portions 215). In a variant, as shown in FIG. 4, the drive means 212 comprise a stationary finger 216 projecting laterally from the body 211 and arranged to push the containers along a stationary member (not visible in FIG. 4) for supporting the containers. The stationary support member comprises two elongate guides that are parallel to each other and that extend substantially along the rectilinear segment 202, being spaced apart from each other by a distance that is greater than the diameter of the neck but less than the diameter of the collar so as to support the containers by their collars with the necks of the containers being received between the two guides. Although toothed portions analogous to the toothed portions 215 are visible in FIG. 4, they would be without purpose in this variant. This variant can also be used with the drive means 112.

The bodies 111, 211 are provided with four vertical-axis pivot wheels 117 (the wheels of the carriages 210 are not visible in the figures), with the rail 101, 201 extending between the wheels in order to allow the carriages 110, 210 to slide along the rails 101, 201 and allow the carriages 110, 210 to move freely along said rails 101, 201.

Each transfer device 100, 200 has a screw 120, 220 extending along the rectilinear segments 102, 202 of the rail 101, 201 and having a thread that co-operates with the fingers 118, 218 secured to the bodies 111, 211 of the carriages 110, 210 in order to drive the carriages 110, 210 along the rectilinear segments 102, 202. Each finger 118, 218 is preferably constituted by a vertical-axis pivot wheel in order to limit friction.

The screw 120 has a pitch serving to keep the carriages 110 at a spacing that is substantially identical to the mutual spacing of the carriages 110 when they are in contact with one another. The number of carriages 110 is such that the carriages 110 are in contact with one another when they are not co-operating with the screw 120. The spacing maintained by the screw 120 serves to bring the preforms supported by the carriages 110 up to the gripper members of the comb 21 and to hold them there so as to enable a batch of containers to pass from the carriages 110 to the comb 21.

The screw 220 has a pitch that varies progressively so that the screw 220 possesses an upstream segment 220.1 providing a first mutual spacing of the carriages 210 equal to the spacing of the carriages 210 when they are in contact with one another, a central segment 220.2 providing a second spacing of the carriages 210 that is greater than the first spacing, and a downstream segment 220.3 providing a spacing of the carriages that is equal to the first spacing. The number of carriages 210 is such that the carriages 210 are in contact with one another when they are not co-operating with the screw 220. As it moves, the comb 22 is caused to extend facing the central segment 220.2, and the second spacing as maintained by the screw 220 makes it possible to bring the carriages 210 up to the gripper members of the comb 22 and to hold the carriages in the gripper members in such a manner as to enable a batch of containers to pass from the comb 22 to the carriages 210.

The first intermediate transfer unit 40 is mounted tangentially to the rectilinear segment 103 of the rail 101 in order to extract the containers from the blowing station 10 and bring them onto the carriages 110. The first intermediate transfer unit 40 is a star having cells at a spacing that corresponds to the spacing of the carriages 210 along the rectilinear segment 103.

The second intermediate transfer unit 50 is mounted tangentially to the rectilinear segment 202 facing the downstream segment 220.3 of the screw 220 in order to take the containers from the carriages and bring them towards the filler station 30. The second intermediate transfer unit 50 is a star having cells at a spacing that corresponds to the spacing of the carriages 210 held by the downstream segment 220.3 of the screw 220.

It can be seen that during the passage of the preforms and of the containers between the carriages and the combs, the preforms and the containers are held mechanically by the combs and by the carriages, which are themselves positioned mechanically by the screws. This results in accurate positioning that makes it easier to pass the preforms and the containers.

It is easy to change the screws and the facing combs in order to match transfer operations to the blowing rate. The screws and the combs are preferably fastened to elements of the structure of the system and to actuators supporting them by means of quick-release couplers.

Naturally, the invention is not limited to the embodiments described, but covers any variant coming within the ambit of the invention as defined by the claims.

In particular, the installation may be of structure that is different from that described, and for example it may comprise:
  some other number of transfer devices;
  a star facing a rounded segment;
  a comb facing a rectilinear segment that does not have a screw;
  no intermediate transfer unit;
  carriages provided with means for moving the containers or the preforms other than hinged gripper clamps;
  the carriages may have some other number of wheels, e.g. three . . . .

The invention is also applicable to any installation for processing articles and to articles of any type.

The invention claimed is:

1. An installation for processing articles, the installation comprising:
  a first processing station;
  a second processing station; and
  an article-transfer device extending between the two processing stations, the transfer device comprising:
    a rail having at least one rectilinear segment and defining a closed travel path for carriages that are mounted on the rail to move freely therealong, each of which is provided with means for driving at least one article; and
    a screw extending along the rectilinear segment of the rail and having a thread that co-operates with fingers secured to the carriages in order to drive the carriages along the rectilinear segment, the carriages being in contact with one another and maintaining the articles mutually spaced relative to one another at a first spacing when they are not co-operating with the screw, and the thread of the screw is arranged to hold the carriages at at least one second spacing that is greater than the first spacing in such a manner that, when the carriages are no longer in engagement with the screw, the carriages are in contact with one another and push against one another under effect of movement imparted by the screw to each of the carriages leaving the screw and coming into contact with each other.

2. An installation according to claim 1, wherein the screw has a pitch that varies from the first spacing to a second spacing and then back to the first spacing.

3. An installation according to claim 1, wherein the carriage comprises a body having a vertical spindle mounted thereon with a bottom end that is provided with an article-gripper member.

4. An installation according to claim 3, wherein the spindle is mounted on the body to pivot about the vertical and possesses a toothed portion meshing with a linear gear running along the rail in order to drive the spindle in rotation during movement of the carriage.

5. An installation according to claim 4, wherein the gear is a cog belt.

6. An installation according to claim 3, wherein the spindle is mounted on the body to slide between the article-gripping position and an article-release position, and the spindle possesses a portion co-operating with a stationary cam path in order to move the spindles between their two positions.

7. An installation according to claim 6, wherein the spindle slides in a vertical direction.

8. An installation according to claim 1, including a stationary article support member that extends substantially along the rail, each carriage comprising a body provided with a laterally projecting finger arranged to push articles along the stationary support member.

9. An installation according to claim 1, having a first intermediate transfer unit mounted tangentially between the first processing station and the transfer device and a second intermediate transfer unit mounted tangentially between the second processing station and the transfer device, the transfer unit being arranged to move the articles while maintaining respective spacings that correspond to the first spacing and to the second spacing of the transfer device.

10. An installation according to claim 9, wherein the first processing station is arranged to process the articles in succession, the first transfer unit is a star, the second processing station is arranged to process the articles in batches, and the second transfer unit is a comb arranged to move a plurality of articles simultaneously and movable along a rectangular travel path having one side that is tangential to the transfer device.

11. An installation according to claim 10, wherein the comb extends facing the screw and is arranged to maintain the articles at a relative spacing corresponding to the second spacing, and the star is arranged to maintain the articles at a relative spacing corresponding to the first spacing.

12. An installation according to claim 11, wherein the articles are hollow articles, the first processing station is an article heater tunnel arranged upstream in the travel direction of the articles, and the second processing station, arranged downstream, is a machine for blowing articles, which machine is arranged to convert them into containers.

13. An installation according to claim 10, wherein the star extends facing the screw and is arranged to maintain the articles at a relative spacing corresponding to the second spacing, and the comb is arranged to maintain the articles at a relative spacing corresponding to the first spacing.

14. An installation according to claim 13, wherein the articles are hollow articles, the first processing station is an article blowing machine that is arranged to convert them into containers and that is arranged upstream relative to the travel direction of the articles, and the second processing station is arranged downstream and is an article-filler machine.

15. An installation according to claim 13, wherein the screw has both a segment providing the first spacing and a segment providing the second spacing, and the star and the comb are each arranged facing one of the segments of the screw.

16. An installation according to claim 1, wherein the articles are hollow articles, the first processing station is an article heater tunnel arranged upstream in the travel direction of the articles, and the second processing station, arranged downstream, is a machine for blowing articles, which machine is arranged to convert them into containers.

17. An installation according to claim 1, wherein the articles are hollow articles, the first processing station is an article blowing machine that is arranged to convert them into containers and that is arranged upstream relative to the travel direction of the articles, and the second processing station is arranged downstream and is an article-filler machine.

* * * * *